United States Patent [19]

Younkin

[11] 4,053,818
[45] Oct. 11, 1977

[54] GYRO SLAVING/BOOT STRAP AMPLIFIER

[76] Inventor: James R. Younkin, 2900 Sheryl, Fayetteville, Ark. 72701

[21] Appl. No.: 672,741

[22] Filed: Apr. 1, 1976

[51] Int. Cl.² .......................... G05B 11/32; G05F 1/00
[52] U.S. Cl. ................................... 318/562; 318/656; 318/648; 244/175
[58] Field of Search ............... 318/648, 647, 562, 677, 318/656, 653; 244/175; 114/144 E

[56] References Cited

U.S. PATENT DOCUMENTS

| 3,888,201 | 6/1975 | Zuvela | 318/647 X |
| 3,952,681 | 4/1976 | Tucker | 318/647 |
| 3,979,090 | 9/1976 | Brickner et al. | 244/175 |
| 3,984,748 | 10/1976 | Sullivan | 318/648 |

Primary Examiner—B. Dobeck
Attorney, Agent, or Firm—Richards, Harris & Medlock

[57] ABSTRACT

A remote magnetic instrument, such as a compass, and a heading indicator, such as a heading gyro, are time shared in a dual channel gyro slaving amplifier with slaving and boot strap circuitry. The amplifier is a two function electronic device wherein the slaving circuit accepts heading error data from a heading gyro and provides separate channels of amplified information to slave drive the heading gyro. The second function of the amplifier is an electronic boot strap circuit to extract information from the heading gyro to drive a remote magnetic instrument. Each of the two functions shares equal time by operation of a time sharing switch with a timing signal provided from a ripple counter. The amplified information providing during the first function of the amplifier is a slaving signal representing heading correction generated by the slaving circuit responding to a heading error signal from the heading indicator. During the second function, a synchronous filter modulator/demodulator responds to angular position signals from the time sharing switching to provide energizing voltages at a modulating frequency to the remote magnetic instruments.

17 Claims, 4 Drawing Figures

GYRO SLAVING/BOOT STRAP AMPLIFIER

This invention relates to information display systems of the type usually employed with aircraft controls, and more particularly to a gyro slaving/boot strap amplifier to drive a slaved heading gyro and a remote magnetic instrument on a time sharing basis.

In an embodiment of the invention to be described, magnetic heading information from a flux detector stator is compared to gyro heading information at the control transformer rotor within a heading indicator. As aircraft heading changes occur, the control transformer rotor within the heading indicator will rotate with the heading card thereby changing the angular relationship to the transformer rotor to the transformer stator. For this same aircraft heading change, the flux detector rotor and stator relationship will likewise change due to its change in position relative to the earth's magnetic field. Providing that the angular relationship between the flux detector rotor/stator and that of the control transformer rotor/stator remains the same, a signal null condition will exist at the control transformer rotor of the heading indicator. This condition signifies that the gyro reading and magnetic heading correspond.

If the angular position between the flux detector and control transformer of the heading indicator changes, an error signal from the control transformer rotor will be applied to a gyro slaving amplifier. This error signal indicates that the gyro position and magnetic heading differ. The slaving amplifier responds to the heading error signal from the heading indicator to generate a correction signal applied across the torquer coil of the indicator.

The torquer assembly within the heating gyro generates a magnetic field whenever an output is present (drive signal) from the slaving amplifier. The torquer consists of a coil, wound on a circular form and positioned close to the inner gimbal of the gyro. A permanent magnet is attached to the gyro gimbal and whenever current is passes through the torquer coil the resultant magnetic field surrounding the coil will either aid or oppose a field of the permanent magnet and cause the gyro gimbal to rotate. The direction of the current flow in the torquer is dependent on the direction of heading error and subsequently the differential output of the slaving amplifier. In this way, the gyro is made to rotate or slave in either direction in accordance with position data from the flux detector.

A feature of the present invention is to provide a gyro slaving/boot strap amplifier wherein the control transformer of a heading indicator is time shared between a flux detector and a remote magnetic instrument.

During the second operational function of an amplifier in accordance with the present invention, an excitation signal is applied to the control transformer rotor of the heading indicator. At this time, the excitation of the flux detector is interrupted thereby interrupting the position data to the control transformer rotor and further interrupting any heading error signal to the slaving amplifier. Effectively, the slaving portion of the amplifier of the present invention (flux detector to control transformer) is switched out.

An excitation signal is applied to the control transformer rotor of the NS detector, angular position information is input to a boot strap circuit. The angular position signal is provided at the stator windings of the control transformer. This angular position signal is converted into a varying DC signal, modulated and subsequently demodulated to provide a signal at a modulating frequency for driving the remote magnetic instrument, such as a remote compass.

In accordance with another feature of the present invention, a gyro slaving/boot strap amplifier is provided for time sharing between a gyro slaving mode and a mode for driving a remote magnetic instrument.

In accordance with the invention, a gyro slaving/boot strap amplifier for driving a heading indicator and a remote magnetic instrument includes switching means receiving input signals from the heading indicator and position data from a flux detector to provide a heading error signal and an angular position signal. A timer generates a time sharing signal to the switching means to alternate the operation thereof between providing the heading error signal or the angular position signal at outputs thereof. Responsive to the heading error signal is a slaving circuit that provides a drive voltage (heading correction) to reposition the heading indicator. A boot strap circuit responds to the angular position signals from the switching means to provide an energizing voltage to the remote magnetic instrument.

A more complex understanding of the invention and its advantages will be apparent from the specification and claims and from the accompanying drawings illustrative of the invention.

Referring to the drawings.

Figure 1:
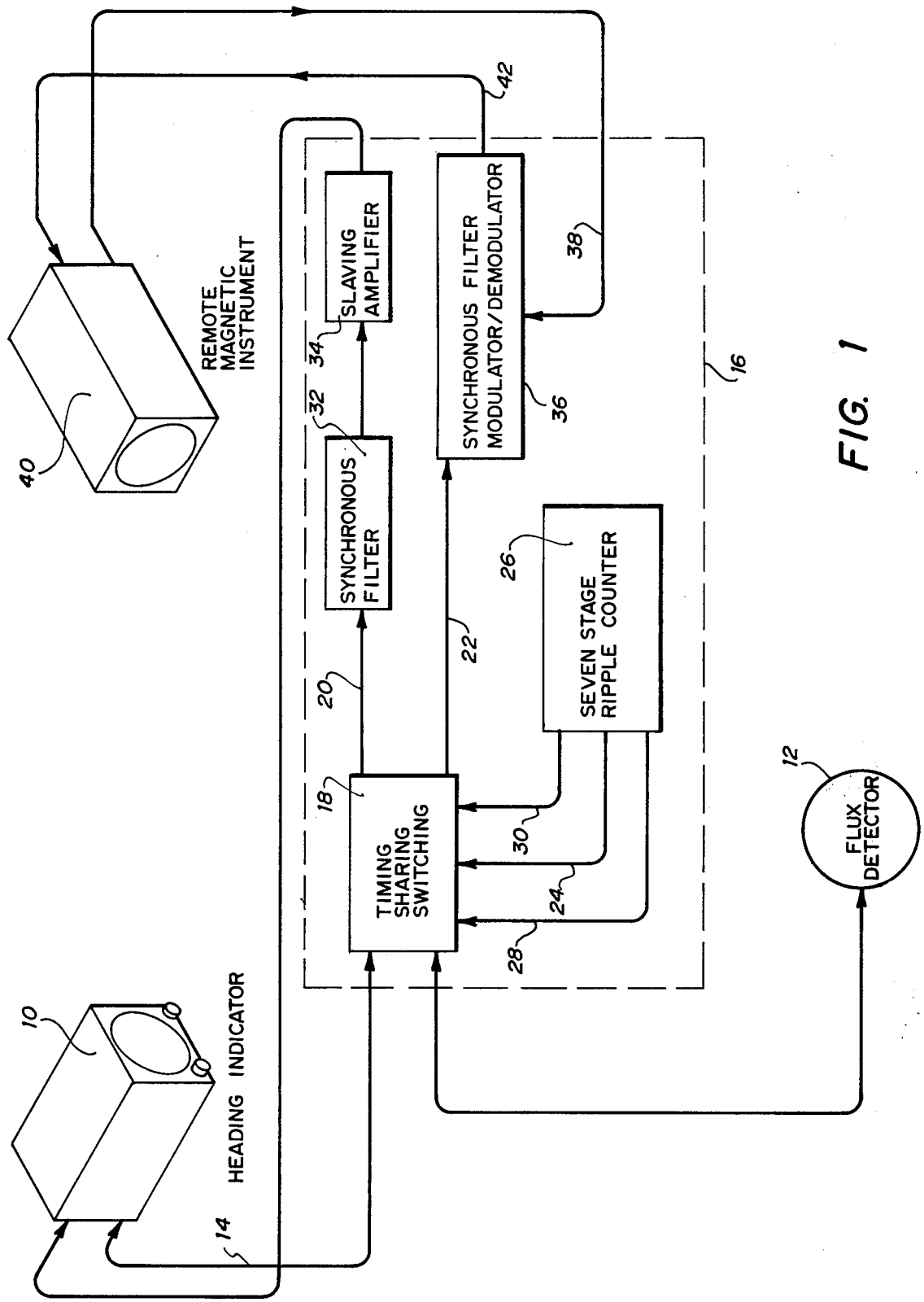
FIG. 1 is a block diagram showing the gyro slaving/boot strap amplifier of the present invention interconnected to a heading indicator, a remote magnetic instrument and a flux detector.

Referring to FIG. 1, a heading indicator 10 includes a control transformer having a rotor winding and a stator winding in accordance with conventional construction. Further, the heading indicator 10 includes a torquer for realigning the angular relationship between the control transformer rotor and the control transformer stator to coincide with the angular relationship between a rotor and a stator within a flux detector 12.

Also in accordance with conventional operation, the flux detector 12 receives a slaving excitation frequency, typically 500 Hz, and produces magnetic position data at the excitation frequency to the stator coil of the control transformer of the heading indicator 10. Any heading error signal generated at the control transformer rotor of the detector 10 is generated on a line 14 and applied to a gyro slaving/boot strap amplifier 16.

Within the amplifier 16, the heading error signal from the heading indicator 10 is applied to a time sharing switch 18 that alternately produces an output signal on a line 20 or a line 22. The time sharing switch 18 is operated to alternately switch between outputs on the lines 20 and 22 by means of a time sharing signal on a line 24 generated as one of three outputs from a seven stage ripple counter 26. A second output from the ripple counter 26 is a slaving excitation frequency on a line 28 for energizing the flux detector 12, as explained. A third output from the counter 26 is a boot strap excitation frequency on a line 30, to be explained.

A heading error signal on the line 20 from the time sharing switch 18 is applied to a synchronous filter 32 which reshapes and filters an otherwise noisy square wave error signal. From the synchronous filter 32, the heading error signal is applied to a slaving amplifier 34 which includes a phase detector stage to convert the phase and amplitude varying error signal to a DC level. The output of the phase detector drives a differential output stage that produces a drive voltage for heading correction to slave the gyro assembly of the heading indicator 10 with the flux detector 12.

During the boot strap time cycle of the amplifier 16, the excitation frequency to the flux detector 12 is disconnected thereby interrupting the magnetic position data transferred to the indicator 10. Instead, the boot strap excitation frequency on the line 30 is applied through the time sharing switch 18 to the control transformer rotor of the detector 10. Angular position information is fed back to the time sharing switch 18 over the line 14 from the stator winding of the control transformer of the indicator 10. This angular position data is transferred through the time sharing switch 18 to the output line 22. This information is applied to a synchronous filter modulator/demodulator 36 that includes AC amplification and synchronous filter stages.

The synchronous filter eliminates unwanted noise and distortion from the angular position data and converts the AC signal from the stator windings of the control transformer into a varying DC level. This varying DC level is applied to a chopper that is driven by a square wave oscillator which is modulated by a modulation frequency on a line 38 originating fronm the supply of a remote magnetic instrument 40. The output of the chopper stage is fed to a filter/demodulator network that eliminates the carrier and passes only a signal at the modulation frequency which varies in amplitude in accordance with the varying DC level. After the filter/demodulator network, the signal is amplified and appears on a line 42 applied to the control transformer of the remote magnetic instrument 40.

Each separate operation of the amplifier 16, that is, generating the heading correction drive signal to the indicator 10 or generating the energizing voltage in the magnetic instrument 40, takes place during one half cycle of the time sharing signal generated on the line 24. Although not necessarily limited thereto, the amplifier of FIG. 1 functions in the heading correction slaving mode during the zero level of the time sharing signal and functions in the remote magnetic instrument boot strap mode during the positive cycle of the signal. During the zero level period of the time sharing signal, the remote magnetic instrument function is switched out and the system functions only in the slaving mode for the indicator 10. Alternately, during the positive cycle of the time sharing signal, the slaving mode is switched out and the amplifier 16 operates only in a boot strap mode to drive the remote magnetic instrument.

Figure 2:
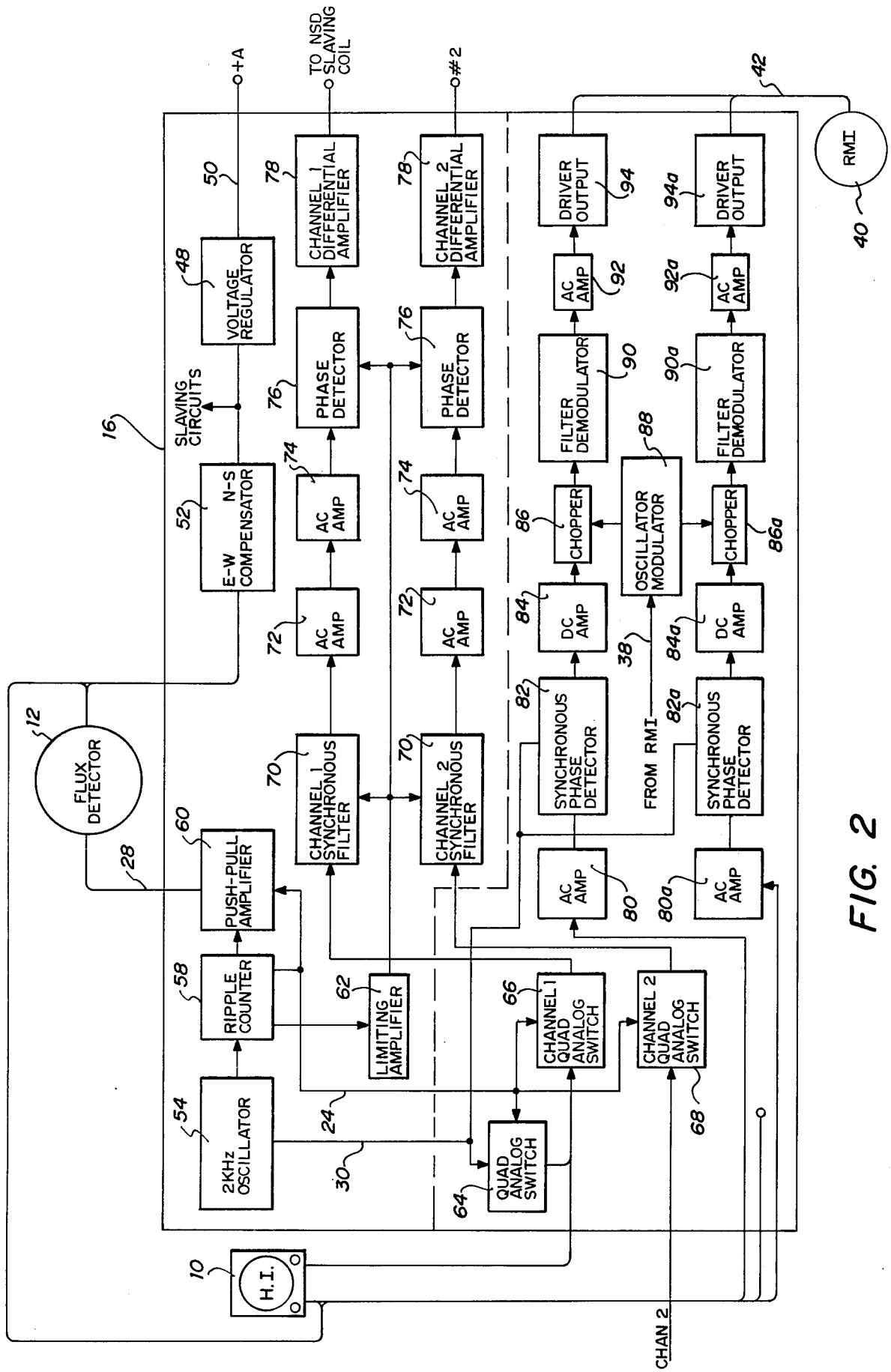
FIG. 2 is an expanded block diagram of the gyro slaving/boot strap amplifier wherein a slaving circuit and a boot strap circuit as separately identified.

Referring to FIG. 2, there is shown a detailed block diagram of the amplifier 16 including a two channel slaving circuit 44 for driving the heading indicator 10 and a boot strap circuit 46 for driving the remote magnetic instrument 40. Also included in the amplifier 16 is a voltage supply circuit including a voltage regulator 48 responsive to a supply voltage on a line 50. The regulated DC voltage from the regulator 40 is applied to drive various components of the amplifier and in addition is connected to a compensator 52 that provides compensation voltages for adjusting east-west and north-south magnetic errors in the magnetic flux detector 12 and the heading indicator 10.

Components of the seven stage ripple counter 26 include an oscillator 54 providing, typically, but not by way of limitation, a 2 KHz square wave on a line 56 to a ripple counter 58 and a 2 KHz sine wave boot strap excitation signal on the line 30. One output of the ripple counter 58 is a square wave excitation frequency for the flux detector 12 that is controlled by a push-pull switching amplifier 60 generating the slaving excitation on the line 28. A second output from the ripple counter 58 is a square wave frequency signal, typically, but not by way of limitation, a 1 KHz square wave applied to a limiting amplifier 62 having an output coupled to components of the slaving circuit 44. A third output of the ripple counter 58 is the time sharing signal on the line 24 for controlling the push-pull amplifier 60 and in addition switching components of the time sharing switch 18. As illustrated in FIG. 2, the time sharing switching signal is a 16 Hz square wave varying from a zero voltage level to a positive voltage level.

Components in the time sharing switch 18 responsive to the switching signal include a quad analog switch 64, a channel #1 quad analog switch 66 and a channel #2 quad analog switch 68. Also applied to the analog switch 64 is the boot strap excitation frequency generated on the line 30.

Typically, the slaving circuit 44 includes dual channels for driving two heading indicators. For purposes of understanding the present invention, however, only one of the channels will be described and the analog switch 68 is not connected to receive an input signal. The second channel of the slaving circuit 44 is thus inoperative to provide a driving voltage to a slaving heading indicator.

One channel, however, of the slaving circuit 44 is connected to the output of the analog switch 66 that transfers a heading error signal on the line 14 to the input of a synchronous filter 70. This filter is excited by the 1 KHz frequency at the output of the limiting amplifier 62 as generated by the ripple counter 58. As explained, the synchronous filter 70 removes any stray spike signals and noise from the heading error signal producing a square wave output whose amplitude is proportional to the energy content of the error signal.

Following the synchronous filter 70, the square wave signal is amplified in AC amplifier stages 72 and 74 and applied to a phase detector 76. The phase of the heading error signal is detected by reference to the output frequency of the amplifier 62 as connected to the phase detector. As explained, the phase detector 76 converts the phase and amplitude varied error signal into a DC level that is applied to an input of a differential amplifier 78. The output of the differential amplifier 78 is a drive voltage for heading correction to the slaving assembly of the heading indicator 10.

The second channel of the slaving circuit 44 includes the same components which are similarly numbered as like components in the first channel.

During operation of the slaving circuit 44, the time sharing switching signal on the line 24 is applied to the push-pull amplifier 60 to excite the flux detector 12 from the ripple counter 58. The time sharing switching signal turns on the push-pull amplifier 60 during one half cycle of the signal on line 24. During this same half cycle, the analog switch 66 is closed to couple the heading error signal from the indicator 10 to the synchronous filter 70. At that time, the quad analog switch 64 is open thereby blocking the boot strap excitation frequency on the line 30.

During the next half cycle of the time sharing switching signal, the amplifier 16 operates in the alternate mode and the push-pull amplifier 60 and the analog switch 66 are open while the analog switch 64 is closed to connect the boot strap excitation frequency on the line 30 to the control transformer rotor of the detector 10. Opening the push-pull amplifier 60 interrupts the excitation of the flux detector 12 thereby disconnecting the position data at the output of the flux detector from the stator winding of the control transformer of the indicator 10. With the analog switch 64 closed and the excitation frequency from the oscillator 54 applied to the control transformer rotor, the stator winding functions as a pick-up to generate angular position data to the boot strap circuit 46. In effect, the control transformer of the indicator 10 is utilized in the reverse of the slaving mode.

Typically, the control transformer stator of a heading indicator 10 is a three wire synchro and in the boot strap mode generates angular position information on the X and Y lines from the stator. The Z-line of the control transformer is AC grounded as signal common.

Basically, the boot strap circuit 46 is a dual channel network wherein the signal on the Y-line of the control transformer stator is applied to an AC amplifier 80 and the signal on the X-line is applied to an amplifier 80a. The control transformer rotor is excited with a very low level signal and thus produces a corresponding low level output from the stator winding. This low level excitation has been found to reduce unwanted interference in the operation of the indicator 10 in the slaving mode.

The AC amplifiers 80 and 80a thus increase the angular position signal to a working level for application to synchronous phase detectors 82 and 82a, respectively. Also connected to the synchronous phase detectors 82 and 82a is a boot strap excitation frequency on the line 30 from the oscillator 54. This excitation frequency is utilized in the phase detectors 82 and 82a to convert the AC input signal into a DC level having an amplitude directly related to the angular position of the control transformer stator relative to the control transformer rotor. The DC level from the phase detectors 82 and 82a is applied to DC amplifiers 84 and 84a, respectively, for amplification before applying to choppers 86 and 86a.

The choppers 86 and 86a receive a modulation frequency from an oscillator modulator 88 having an input responsive to the modulation signal on the line 38 from the remote magnetic instrument 40. The modulation signal on the line 38, which may be a square wave or a sine wave, pulse width modulates the internally generated frequency of the oscillator 88. The output of the oscillator modulator 88 as applied to the choppers 86 and 86a is the frequency of the oscillator that is pulse width modulated by the modulation signal. This signal modulates the DC level applied to the choppers 86 and 86a into an AC signal at the modulation frequency. The modulated output of the choppers 86 and 86a is applied to filter/demodulator networks 90 and 90a, respectively.

The filter portion of the networks 90 and 90a removes the carrier frequency of the oscillator 88 and produces a signal at a frequency the same as the modulation signal on the line 38. The result is an AC signal from each of the networks 90 and 90a that is applied to an AC amplifier 92 and 92a, respectively, for further amplification. Following the amplifiers 92 and 92a, the signals are applied to driver outputs 94 and 94a that produce an energizing voltage to the remote magnetic instrument 40 over the line 42. The AC output of the amplifiers 92 and 92a, as applied to the output drivers 94 and 94a, respectively, varies in amplitude and phase in accordance with the angular position data generated at the stator of the control transformer of the indicator 10.

Summarizing the operation of the amplifier 16, during one half cycle of the time sharing switching a signal on the line 24, the push-pull amplifier 60 is closed to excite the flux detector 12 for supplying magnetic position data to the stator of the control transformer of the indicator 10. Heading error signals as generated at the rotor of the control transformer are applied through the analog switch 66, which is closed during the same half cycle of the time sharing switching signal that closes the amplifier 60, to the input of the synchronous filter 70. After processing to the amplifiers 72 and 74, the phase detector 76 and the differential amplifier 78, the driving voltage is applied to the torquer assembly of the indicator 10 for heading correction.

During the second half cycle of the time sharing switching signal on the line 24, the amplifier 60 and the analog switch 66 are opened while the quad analog switch 64 is closed. During this half cycle, the excitation frequency to the flux detector 12 is interrupted and the boot strap excitation frequency on the line 30 is applied through the switch 64 to the rotor winding of the control transformer of the indicator 10. The stator now functions as an angular position pick-off and angular position data is generated and applied to the amplifiers 80 and 80a. After processing through the parallel channels of the boot strap circuit 46, an energizing voltage is produced on the line 44 to the remote magnetic instrument 40.

Although the sampling rate for the slaving circuit 44 and the boot strap circuit 46 are time shared at a rate determined by the time sharing switching signal, the heading correction driving voltage to the heading indicator 10 is effectively continuous as is the driving voltage to the remote magnetic instrument 40. This is achieved by sample and hold circuits comprising a part of the synchronous filter 70 of the slaving circuit 40 and a synchronous filter as part of the choppers 86 and 86a. Therefore, during that period when the circuit is effectively disconnected from a signal source the hold circuit will pass the last heading error signal or angular position data to the appropriate instrument.

Figure 3:
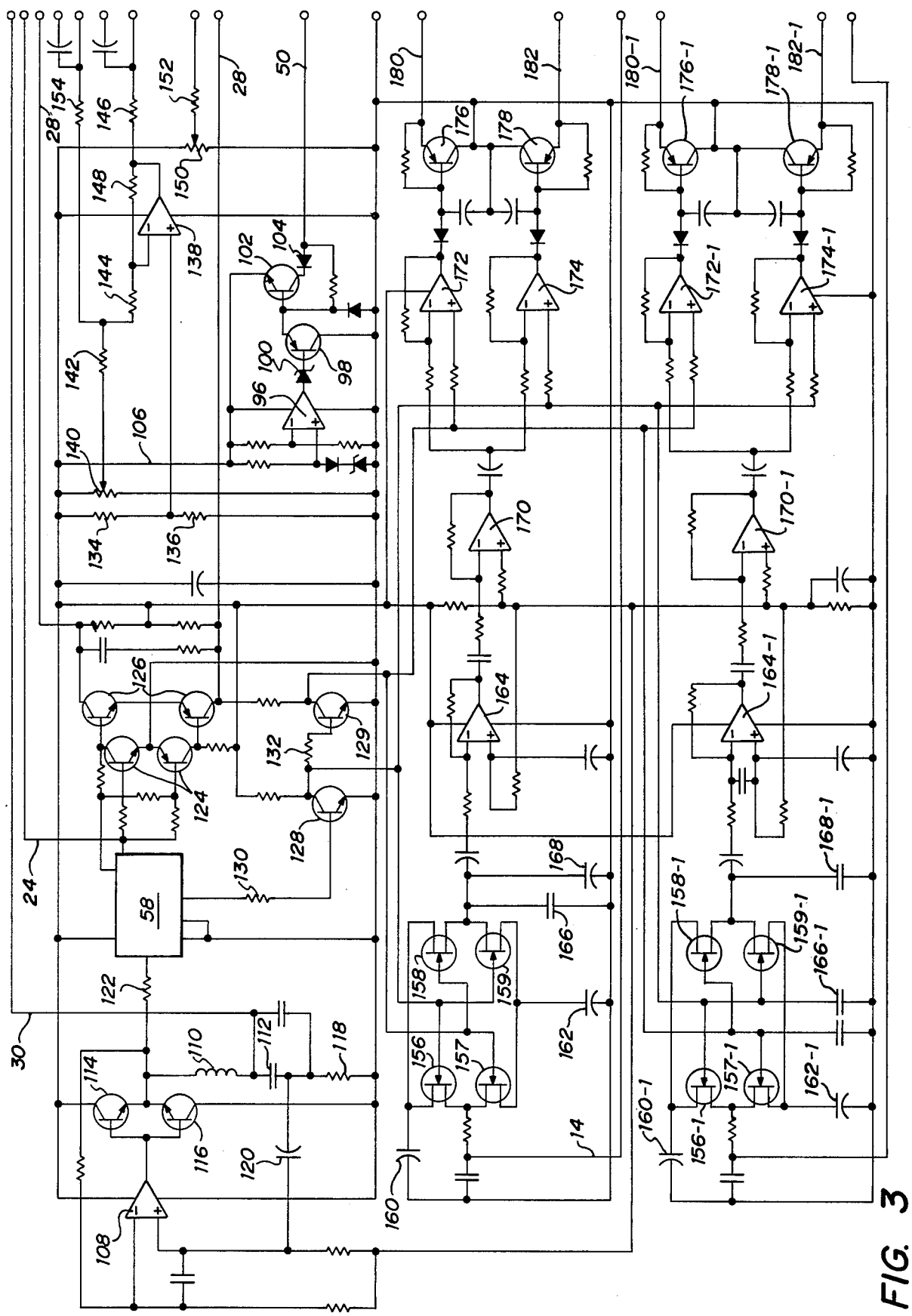
FIG. 3 is a schematic of the slaving circuit of the amplifier of FIG. 2.

Referring to FIG. 3, there is shown a schematic of the amplifier 16 wherein the voltage regulator 48 comprises an operational amplifier 96 driving a transistor 98 through a Zener diode 100. The transistor 98 in turn drives a transistor 102 connected to the line 50 through a diode 104. A regulated voltage at the emitter electrode of the transistor 102 drives the various components of the amplifier by means of a line 106.

The oscillator 54 is one component connected to the line 106 and comprises a high gain operational amplifier 108 with a series LC resonant network consisting of an inductor 110 in series with a capacitor 112 that controls the operating frequency of the oscillator. The LC resonant network is driven from the operational amplifier 108 through transistors 114 and 116. A feedback signal to the operational amplifier 108 is generated across the resistor 118 and fed back through a capacitor 120 to the regenerative terminal of the operational amplifier. A sine wave output from the oscillator 54 is developed at the interconnection of the inductor 110 with the capacitor 112 and is applied to the quad analog switch 64 over the line 30.

A square wave output of the oscillator 54 is generated at the interconnection of the transistors 114 and 116 and applied through a resistor 122 to the ripple counter 58. One output of the ripple counter 58 is the excitation frequency for the flux detector 10 and is applied to the push-pull amplifier 60 which consists of two Darlington pairs each including transistors 124 and 126 connected in a push-pull arrangement. The collector electrodes of the transistors 126 provide the excitation frequency to the flux detector 12 over the line 28.

A second output from the ripple counter 58 as generated on the line 24 is the time sharing switching signal. This switching signal is also applied to the base electrodes of the transistors 124 to control the on-off cycle thereof to in turn control the application of an excitation frequency to the flux detector 12.

A third output from the ripple counter 58 is applied to the limiting amplifier 62 that comprises transistors 128 and 129 with the base drive of the former applied to a resistor 130 and the base drive of the latter applied through a resistor 132. An output for driving the synchronous filters 70 and the phase detectors 76 is generated at the collector electrode of the tranistors 128 and 129.

Also included as part of the slaving circuit 44 of FIG. 3 is the compensator 52 including a divider network of resistors 134 and 136 connected to one input of an operational amplifier 138. The second input to the operational amplifier 138 is established across a potentiometer 140 through resistors 142 and 144. An output at the operational amplifier is applied through a resistor 146 to the flux detector 12 and the stator of the control transformer of the indicator 10. A feedback resistor 148 controls the gain of the amplifier 138.

Further adjustment by the compensator 52 is provided by a potentiometer 150 interconnected to the detector 12 and the indicator 10 through a resistor 152. The third line of the detectors 10 and 12 is connected to the resistor 142 through a resistor 154. Considering again only one channel of the two shown for the slaving circuit 44 of FIG. 2, a heading error signal on the line 14 as coupled through the analog switch 66 is applied to the synchronous filter 70 comprising, in FIG. 3, field effect transistors 156–159. The heading error signal, by operation of the transistors 156–159, is alternately stored on the capacitors 160 and 162. The transistors 156–159 comprise a two pole synchronous switch that is oppositely phased such that when transistor 156 is on transistor 157 will be off, transistor 159 will be on and transistor 158 will also be off. Thus, for each half cycle of the frequency from the limiting amplifier 62 the signal stored on either the capacitor 160 or capacitor 162 will be applied to the AC amplifier 70 consisting of an operational amplifier 164. Filtering of the square wave output as generated at the interconnection of the transistors 158 and 159 is provided by capacitors 166 and 168. Further amplification of the output of the filter 70 is provided by the amplifier 74 consisting of an operational amplifier 170.

Amplified AC signals from the operational amplifier 170 are applied to the phase detector 76 consisting of operational amplifiers 172 and 174 each having an output driving a transistor 176 and 178, respectively, as a differential amplifier. An output from the transistors 176 and 178, as generated at the emitter electrodes thereof, is applied to the torquer coil of the indicator 10 over the lines 180 and 182. The phase detector circuit amplifiers 172 and 174 are also connected to the limiting amplifier 62 at the collector electrodes of the transistors 128 and 129.

For the second channel of the boot strap circuit 44 the same reference numerals are used to identify like components. Again, this second channel has not been utilized in the description of the amplifier 16 to avoid undue complication in the explanation of the overall circuit operation.

As explained previously, during one half cycle of the time sharing switching signal the slaving circuit 44 is disconnected from the indicator 10 and the boot strap circuit 46 responds to angular position data. During this half cycle, the charge on the capacitors 160 and 162 maintains the previous heading error signal to generate a drive voltage on the lines 180 and 182 for the next half cycle when the slaving circuit 44 again provides heading correction to the detector 10. The switching between the alternate functions of the amplifier 16 is at a rate such that the heading correction is essentially continuous as observed by an operator. Thus, during each half cycle of time sharing switch signal, the capacitors 160 and 162 are updated with the current heading error signal.

Figure 4:
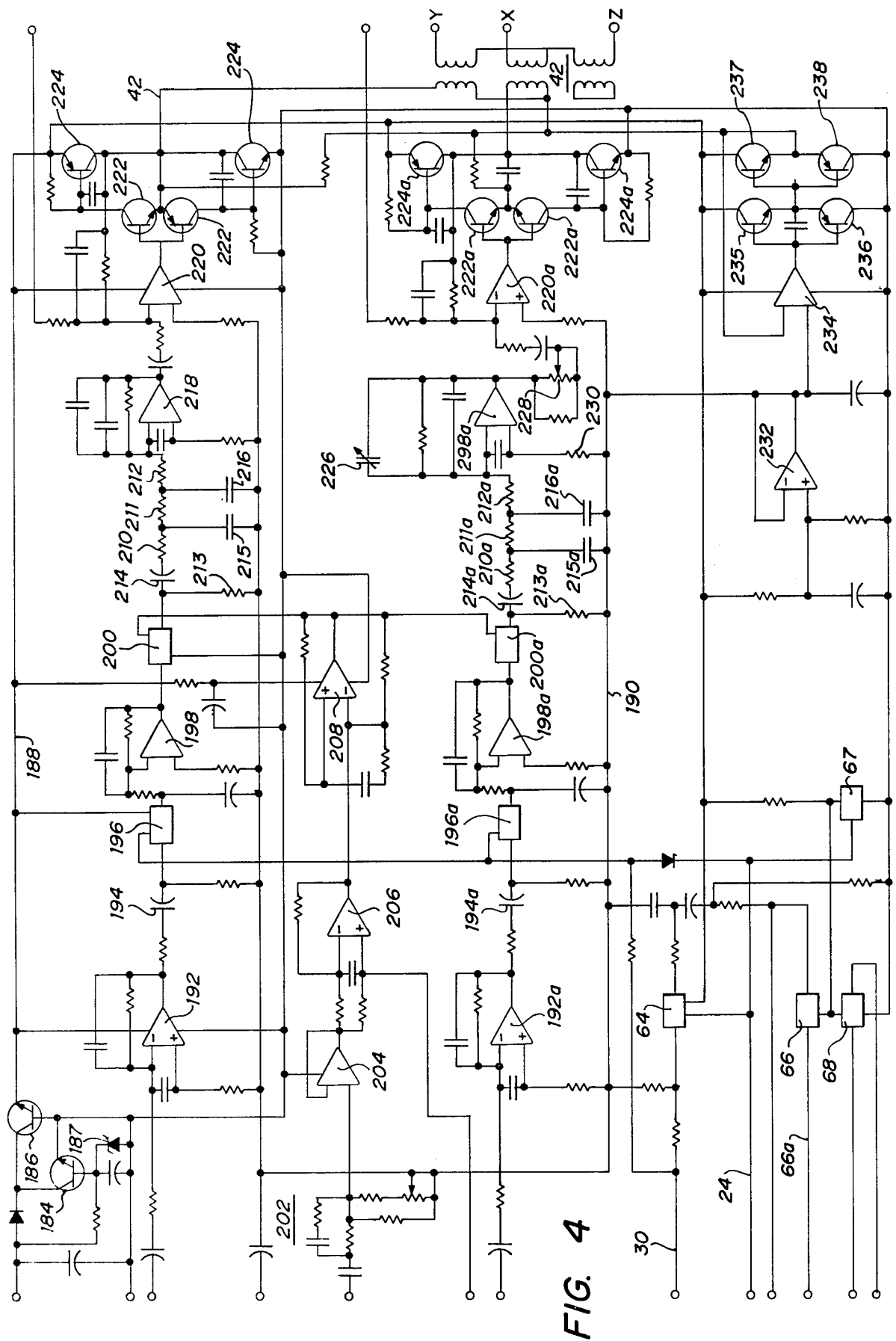
FIG. 4 is a schematic of the boot strap circuit of the amplifier of FIG. 2.

Referring to FIG. 4, there is shown a schematic of the boot strap circuit 46 including the analog switches 64, 66 and 68. The switch 64 is controlled directly by the time sharing switching signal on the line 24 to switch the excitation frequency on the line 30 to the rotor of the control transformer during the boot strap operation. Analog switches 66 and 68 are controlled by the time sharing switching signal through an intermediate switch 67. These two switches 66 and 68 are closed during the gyro slaving operation to apply the heading error signal to the synchronous filter 70. With regard to the channel shown operational in FIG. 2, a headng error signal as generated on the line 14 is passed through the switch 66 on a line 66a to the transistors 156 and 157, see FIG. 3, of the synchronous filter 70.

To provide drive voltages to the various components of the boot strap circuit 46, emitter follower transistors 184 and 186 comprise a voltage regulator. Voltage regulation is provided by a Zener diode 187 in the base drive circuit for the transistor 184. A regulated voltage to the various circuit components is provided at the emitter electrodes of the transistor 186 on a line 188.

During the boot strap operation, the Z-line of the stator of the control transformer of the detector 10 is connected to signal common on the line 190. The Y-line of the control transformer stator is coupled to the AC amplifier 80 comprising an operational amplifier 192 having an output to the synchronous phase detector 82 including a coupling capacitor 194 for applying the output of the operational amplifier to a switch 196 synchronously controlled by the boot strap excitation frequency on the line 30. Also making up the phase detector 82 is an operational amplifier 198 providing a DC level related to the angular position data from the control transformer stator. An output from the amplifier 198 is coupled to the chopper 86 consisting of a switch 200.

The modulation signal on the line 38 is coupled through an input circuit 202 to an operational amplifier 204 that in turn drives an operational amplifier 206 all as a part of the oscillator modulator 88. Also included in the oscillator modulator 88 is an operational amplifier 208 having an output coupled to the switch 200.

The modulated output of the switch 200 is applied to a filter network consisting of resistors 210-213 and capacitors 214-216. A filtered output at the resistor 212 is applied to the input of an operational amplifier 218 as part of a demodulator circuit that drives the AC amplifier 92 consisting of an operational amplifier 220. An output of the operational amplifier 220 is coupled to the output driver consisting of Darlington pairs of transistors 222 and 224 connected in a differential configuration. An output of the driver 94 is generated at the common connection of the collector electrodes of the transistors 224 and is applied by means of the line 42 to the remote magnetic instrument 40.

The X-line of the stator of the control transformer of the detector 10 is coupled to the second channel of the boot strap circuit 46 wherein like components as in the first channel are similarly numbered with the components of the second channel further identified by an "a". The second channel is thus similarly connected and provides an output on the line 42 at the interconnection of the transistors 224a. One modification of the second channel is the addition of a variable capacitor 226 in a feedback loop for the operational amplifier 218a. This capacitor is included to allow adjustment of the phase shift of both channels to be equal for a zero degree heading input signal. Further, the output of the amplifier 218a is coupled to the input of the amplifier 220a through an adjustable gain network comprising a potentiometer 228 in parallel with a resistor 230. This allows the adjustment of the absolute magnitude of the output signal from the drivers 94 and 94a to be equal for equal input signals.

Also included as part of the boot strap circuit 46 is a voltage supply comprising an operational amplifier 232 for controlling the voltage level of the signal common line 190, and an operational amplifier 234 driving transistors 235-238 for determining the operating level of the output drivers 94 and 94a.

Operationally, the circuits of FIGS. 3 and 4 are as described with regard to the block diagram of FIG. 2. The time sharing switching signal alternates the operation of the circuits of FIGS. 3 and 4 to drive either the indicator 10 or the remote magnetic instrument 40.

While only one embodiment of the invention, together with modifications thereof, has been described in detail herein and shown in the accompanying drawings, it will be evident that various further modifications are possible without departing from the scope of the invention.

What is claimed is:

1. A gyro slaving/boot strap amplifier for driving a heading indicator and a remote magnetic instrument, comprising in combination:
   switching means receiving input signals from the heading indicator and magnetic position data from a flux detector to provide a heading error signal and an angular position signal,
   a timer generating a time sharing signal to said switching means to alternate the operation thereof between providing the heading error signal and the angular position signal,
   a slaving circuit responsive to the heading error signal from said switching means to provide a drive voltage to the heading indicator, and
   a boot strap circuit responsive to the angular position signal from said switching means to provide an energizing signal to the remote magnetic instrument.

2. A gyro slaving/boot strap amplifier as set forth in claim 1 wherein said boot strap circuit includes means for converting the angular position signal into a varying DC level.

3. A gyro slaving/boot strap amplifier as set forth in claim 2 wherein said boot strap circuit further includes a modulator responsive to a modulation signal and providing a chopping frequency to said means for converting to modulate the varying DC level.

4. A gyro slaving/boot strap amplifier as set forth in claim 3 wherein said boot strap circuit includes means to demodulate the modulated DC level into an energizing signal to the remote magnetic instrument at the frequency of the modulation signal.

5. A gyro slaving/boot strap amplifier for driving a heading indicator and a remote magnetic instrument, comprising in combination:
   switching means receiving input signals from the headng indicator and magnetic position data from a flux detector to provide a heading error signal and an angular position signal,
   a timer generating a time sharing signal to said switching means to alternate the operation thereof between providing the heading error signal and the angular position signal,
   a slaving circuit responsive to the heading error signal from said switching means to provide a correction voltage to the heading indicator, and
   a modulator/demodulator responsive to the angular position signal from said switching means and a modulation signal from the remote magnetic instrument to provide an energizing signal thereto.

6. A gyro slaving/boot strap amplifier as set forth in claim 5 wherein said timer generates an excitation signal to the heading indicator during the operation of said switching means for providing the angular position signal.

7. A gyro slaving/boot strap amplifier as set forth in claim 5 wherein said modulator/demodulator includes a phase detector responsive to the angular position signal and an excitation signal to provide a DC level varying with the position signal to be modulated by the modulation frequency.

8. A gyro slaving/boot strap amplifier as set forth in claim 7 wherein said modulator/demodulator includes means to demodulate the modulated DC level into an energizing signal to the remote magnetic instrument at the modulation frequency.

9. A gyro slaving/boot strap amplifier as set forth in claim 5 wherein said timer generates a square wave time sharing signal to alternate the operation of said switching means to provide the heading error signal at one level of the square wave and to provide the angular position signal during the second level of the square wave.

10. A gyro slaving/boot strap amplifier for driving a heading indicator having a control transformer with a rotor and stator, and further driving a remote magnetic instrument, comprising in combination:
   a time sharing switch receiving a heading error signal as generated at the rotor of the control transformer, magnetic position data from a flux detector, and an angular position signal from the stator of the control transformer,
   a timer generating a time sharing signal to said switch to alternate the operation thereof to: first, apply the magnetic position data to the stator and the heading error signal to an output of said time sharing switch, and second, applying an excitation signal to the rotor and the angular position signal to the output of said time sharing switch, a slaving circuit responsive to the heading error signal from said time sharing switch to provide a drive voltage to the heading indicator, and a boot strap circuit responsive to the angular position signal from said time sharing switch to provide an energizing voltage to the remote magnetic instrument.

11. A gyro slaving/boot strap amplifier as set forth in claim 10 wherein said timer generates the excitation signal applied to the rotor during the second operation of said time sharing switch.

12. A gyro slaving/boot strap amplifier as set forth in claim 10 wherein said timer generates an excitation frequency to the flux detector during the first operation of said time sharing switch.

13. A gyro slaving/boot strap amplifier as set forth in claim 10 wherein said timer generates a square wave time sharing signal, a first excitation frequency as the excitation signal applied to the rotor during the second operation of said time sharing switch and a second excitation frequency applied to the flux detector during the first operation of said time sharing switch.

14. A gyro slaving/boot strap amplifier as set forth in claim 13 wherein a time sharing switch operates to apply the position data to the stator and the heading error signal to an output during one level of the generated time sharing signal and operates to apply the excitation frequency to the rotor and the angular position signal to an output during the second level of the square wave shearing signal.

15. A gyro slaving/boot strap amplifier as set forth in claim 10 wherein said boot strap circuit includes a synchronous phase detector for converting the angular position signal into a varying DC level.

16. A gyro slaving/boot strap amplifier as set forth in claim 15 including a modulator responsive to a modulation frequency and providing a chopping frequency to chopper means for modulating the varying DC level.

17. A gyro slaving/boot strap amplifier as set forth in claim 16 including a demodulator for converting the modulated DC level into an energizing voltage to the remote magnetic instrument at the frequency of the modulation signal.

* * * * *